United States Patent
Ahnert

(10) Patent No.: US 10,167,904 B2
(45) Date of Patent: Jan. 1, 2019

(54) ADJUSTMENT DEVICE FOR A FRICTION CLUTCH

(71) Applicant: Schaeffler Technologies GmbH & Co. KG, Herzogenaurach (DE)

(72) Inventor: Gerd Ahnert, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 153 days.

(21) Appl. No.: 14/385,845

(22) PCT Filed: Mar. 11, 2013

(86) PCT No.: PCT/EP2013/054814
§ 371 (c)(1),
(2) Date: Sep. 17, 2014

(87) PCT Pub. No.: WO2013/139634
PCT Pub. Date: Sep. 26, 2013

(65) Prior Publication Data
US 2015/0068861 A1 Mar. 12, 2015

(30) Foreign Application Priority Data

Mar. 21, 2012 (DE) .......................... 10 2012 204 473

(51) Int. Cl.
*F16D 13/38* (2006.01)
*F16D 13/75* (2006.01)

(52) U.S. Cl.
CPC ............. *F16D 13/75* (2013.01); *F16D 13/38* (2013.01); *F16D 13/757* (2013.01)

(58) Field of Classification Search
None
See application file for complete search history.

(56) References Cited

U.S. PATENT DOCUMENTS

| 1,330,965 A | 2/1920 | White | |
|---|---|---|---|
| 2,409,013 A * | 10/1946 | Bodmer | F16D 13/757 192/111.6 |

(Continued)

FOREIGN PATENT DOCUMENTS

| DE | 102009032332 A1 * | 2/2010 | ........... F16D 13/757 |
|---|---|---|---|
| DE | 102009035225 | 2/2010 | |

OTHER PUBLICATIONS

"Friction Coupling Has Coupling Housing with Torque Proof and Axially Limited Pressure Plate, Where Pressure Plate is Firmly Arranged by Lever System at Coupling Housing." DE102009032332A1. Web. Apr. 18, 2016. (https://patents.google.com/patent/DE102009032332A1/en).*

*Primary Examiner* — Jacob S. Scott
(74) *Attorney, Agent, or Firm* — Volpe and Koenig, P.C.

(57) ABSTRACT

An adjustment device (1) for a friction clutch (2), including at least the following components: a rotatable driving device (3); an adjustment spindle (4) having an axial direction, which is connected to the driving device in a rotationally fixed manner; a spindle nut (6), which is moved in the axial direction by rotation of the adjustment spindle; and an adjusting unit (7) for adjusting a distance (8) between an engagement device (9) and a pressure plate (10), which adjusting unit is adjusted by an axial motion of the spindle nut (6) in such a way that the axial direction (5) of the adjustment spindle (4) can be oriented parallel to a radial direction (11) of the friction clutch (2). Through the adjustment device here, it is possible to realize a robust functional unit that is sufficiently stiff with respect to the applied centrifugal forces and that has low production requirements, low weight, and low installation space.

12 Claims, 3 Drawing Sheets

(56) References Cited

U.S. PATENT DOCUMENTS

| | | | |
|---|---|---|---|
| 4,896,734 A * | 1/1990 | Horiuchi | F02B 67/10 |
| | | | 123/559.1 |
| 7,178,649 B2 * | 2/2007 | McCutcheon | F16D 13/757 |
| | | | 192/111.2 |
| 2006/0116232 A1 | 6/2006 | McCutcheon | |

* cited by examiner

ADJUSTMENT DEVICE FOR A FRICTION CLUTCH

BACKGROUND

The invention relates to an adjustment device for a friction clutch, which is provided in order to compensate an extension of the engagement paths, for example in case of reducing thickness of the friction coatings of the friction clutch. Such adjustment devices and/or friction clutches are particularly useful in clutches of motor vehicles during start-up.

In a friction clutch a plurality of friction areas are made to contact in order to transfer a torque, while a relative motion occurs between these friction areas. Here, mandatorily wear and tear occurs in the form of material abrasion such that the distance between the two friction areas increases by the reduction of the thickness of the friction coatings over the course of the increasing wear and tear of the friction clutch. Adjusting units must generate considerable forces, requiring expensive construction. Here, in spite of a change of the thickness of the friction coatings over the duration of use, it is advantageous for the engagement units to particularly describe a constant and short engagement path. In order to avoid the displacement path of the engagement unit becoming unnecessarily long, recently many applications started to use adjustment devices. The wear and tear of the friction coatings is dependent on the shifting behavior as well as the use of the friction clutch and thus here the adjustment of the extending engagement path must be set individually for the respective abrasion of each friction clutch. Additionally, settling behavior develops in friction clutches, which can be compensated by an adjustment device.

In order to change the distance between the friction areas it has become common to use a ramp construction at the rear of the pressure plate with a corresponding ramp construction at a displacement ring. By rotating the displacement ring in the circumferential direction the position of the pressure plate is changed axially in the friction clutch, leading to the distance between the friction areas to be altered. The engagement device, impacting the rear of the displacement ring, describes here an almost constant engagement path. In order to rotate the displacement ring devices are used in prior art which are aligned tangentially in reference to the circumference of the pressure plates, for example a worm drive, a spindle, or a sprocket. In such constructions it is disadvantageous that particularly worm drives and spindle drives are subject to high centrifugal forces, which are directed perpendicular to their axial alignment. Therefore, the bearings of such adjustment devices must be embodied in a particularly robust fashion, and the play between the elements of the adjustment device must be kept low. This renders such adjustment devices to be also particularly sensitive to temperature changes.

SUMMARY

With this being the given status, the present invention is based on the objective to at least partially overcome the disadvantages known from prior art. The objective is attained in the features of the independent claims. Advantageous further developments are the objective of the dependent claims.

The invention relates to an adjustment device for a friction clutch, which includes at least the following components:

a rotational driving device;
an adjustment spindle with an axial direction which is connected to the driving device in a torsionally fixed fashion;
a spindle nut moved by a rotation of the adjustment spindle in the axial direction; and
an adjusting unit for adjusting the distance between the engagement device and a pressure plate, which is adjusted by the axial motion of the spindle nut.

The adjustment device is characterized in that the axial direction of the adjustment spindle can be aligned parallel in reference to a radial direction of a friction clutch.

The adjustment device keeps constant the engagement path of a friction clutch when the thicknesses of the friction coatings are reducing as well as in case of settlement occurring. This is achieved, for example, such that a ramp collar and a ramp on the rear of a pressure plate of the friction clutch are rotated in reference to each other. This way, the pressure plate is moved in the direction towards the opposite area, while the rear of the ramp collar, subjected to the impact of the engagement device, being axially fixed. The adjustment device includes a rotational driving device, which is rotated based on the detection of a change of the distance between the pressure plate and the opposite friction area. For example, the driving device may be realized by a wheel with a freewheel gearing, which is rotated via a spring shackle, engaging freewheel gearing, when the distance changes during the engagement process. This may be implemented for example controlled by the path length or by force. The adjustment spindle has an axial direction, about which the spindle can be rotated. Here, the adjustment spindle includes a helical groove, by which the spindle nut is moved in the axial direction when the adjustment spindle is rotated. Here, the adjustment spindle is driven via the driving device by way of connecting the two components to each other in a torque-proof fashion. Thus, when the driving device is rotated, here the adjustment spindle is also rotated and in turn the spindle nut is also moved in the axial direction. The spindle nut is here secured against a rotation about the axial direction and/or about the adjustment spindle so that the rotation is converted into a translational motion.

Furthermore, an adjusting unit is provided, which is implemented for changing the distance between the engagement device and the pressure plate and/or the wearing out friction area of the pressure plate. For this purpose, the adjustment device can affect a ramp collar such, for example, that it describes a relative motion in reference to the ramp of the pressure plate and thus leads to an engagement and/or a motion of the engagement device of the pressure plate. Here, the adjusting unit is displaced via the axial motion of the spindle nut, so that via the input of the driving device the adjusting unit appropriately sets the distance between the engagement device and the pressure plate.

Here, the axial direction of the adjustment spindle can be aligned parallel in reference to a radial direction of a friction clutch. This means, the adjustment spindle points from the central axis of the friction clutch, with the friction disks of the friction clutch rotating about it, towards the exterior circumference of the friction clutch. This direction is equivalent to the direction of the centrifugal force during the operation of the friction clutch, which at common speeds particularly of internal combustion engines, leads to considerable stress upon the components. Particularly due to the spiral nut, a spindle is sensitive to lateral forces and must be reinforced here by considerably increased material mass, resulting in an increased inertia. This also leads to an increase in structural space required, higher weight stressing the attachments, and increased bearing expense in order to compensate the forces of the weight of the adjustment device. In the adjustment spindle suggested here this primary stress is aligned in the axial direction of the adjustment spindle. Thus, the stress occurs in the stiffest direction of the adjustment spindle. This means, the adjustment spindle can be designed exclusively focusing on the protection from bending. Here, the adjustment spindle only needs to be axially supported and the bearing expense is therefore low. Overall, such an adjustment device can be designed very much smaller and lighter, in turn resulting in the overall design of the friction clutch to be less complex.

In another advantageous embodiment of the adjustment device the adjusting unit comprises a link and the spindle nut comprises a link block corresponding to the link.

In order to transfer the motion of the spindle nut in the radial direction of the friction clutch, for example upon a ramp collar which rotates about the rotary center of the friction clutch, thus perpendicular in reference to the alignment of the adjustment spindle, particularly a link with a corresponding link block is suitable, here. For this purpose, the link may be a groove, which extends approximately in a straight line and shows for example an incline of 30° to 60°, preferably approximately 45°, with regards to a radial beam and this way converts a translational motion of the link block in the radial direction into a direction which is aligned perpendicular in reference thereto. In such an example the link block is provided in a groove and glides along the groove wall of the link during a motion. However, the link may also be formed by an elevation and the link block by a corresponding form encompassing said elevation. In order to transfer the straight motion of the spindle nut here the link is particularly slightly curved so that a homogenous transfer of the motion of the link block and/or the spindle nut occurs. However, the link can also transfer different transmission ratios if this is advantageous for the progression of the adjustment nut towards the adjustment device.

The adjusting unit may here represent a separate component, which for example can be connected via gears to a ramp collar or the pressure plate. This way, a motion in the direction of engagement of the ramp collar and/or the pressure plate can be implemented without here the position of the adjusting unit changing in reference to the adjustment spindle during this adjustment.

In another advantageous embodiment of the adjustment device the spindle nut is supported axially disengaged from the adjustment spindle.

For this purpose, the spindle nut can be supported such that any forces developing, which are aligned perpendicular in reference to the adjustment spindle, which means particularly the weight of the spindle nut during a rotation of the friction clutch, are disengaged from the adjustment spindle so that it is only stressed by its own weight perpendicular in reference to the axial direction.

According to another aspect of the invention a friction clutch is suggested including at least the following components:
  a pressure plate, having a pressure side and an opposite rear with at least one ramp;
  a ramp collar corresponding to at least one ramp for changing the distance between the engagement device and the pressure plate by way of rotating the ramp collar in the circumferential direction which is in contact with at least one ramp of the pressure plate; and
  an adjustment device for changing the distance with an axial direction, characterized in that the axial direction of the adjustment device is aligned in the radial direction of the friction clutch.

The friction clutch is particularly embodied for transmitting a torque in a disengageable fashion, which for example shall be transmitted from a drive unit to a drive train. Here, frequently at the input side of the drive train a gearbox is provided, which can be shifted only when the torque is disconnected so that a transmission and/or translation of the rotation and/or the torque is possible from the drive unit to the drive train. Here, the transmission of the torque occurs via one or more friction packages, which are assembled from a plurality of mutually corresponding friction areas, which can be connected to each other via a compression force such that the friction force applied is sufficient for transmitting torque from one of the friction areas to the respectively corresponding friction area.

At least one of the friction areas is here connected to an input shaft in a torque-proof fashion and at least one corresponding friction area is connected to an output shaft. In such a friction package the exterior friction area is formed by a pressure plate, which is compressed via an engagement device with the corresponding friction area in order to transmit torque. Here, the pressure side of the pressure plate comprises a friction area and the opposite rear is embodied for compensating the compression force via the engagement device in the direction of engagement. At least one ramp is provided on this rear which extends in the circumferential direction and projects in the direction of engagement from the rear of the pressure plate. The incline of the ramp shall here be adjusted to the desired adjustment characteristic. A corresponding ramp collar is provided on at least one ramp, which is rotational by a rotation in the circumferential direction, thus along the incline of the area of the ramp. By at least one ramp contacting the ramp collar the pressure plate is mobile in the direction of engagement of the friction clutch. Here, the ramp collar is arranged between the engagement device and the pressure plate. Accordingly, the distance between the engagement device and the pressure plate can be altered. The ramp collar is rotated in the circumferential direction by the adjustment device and thus, according to a detection of the reduction of the thickness of the friction coatings of the friction clutch, the distance between the engagement device and the pressure plate is changed so that the distance between the friction areas remains almost constant and the engagement path of the engagement device remains almost constant as well. Here, the adjustment device extends in an axial direction and is formed by a shaft, particularly comprising a worm or a spindle. Advantageously the adjustment device is here aligned in the radial direction of the friction clutch. Thus the adjustment device is advantageously aligned along a direction of the centrifugal forces so that the weight forces are aligned in the direction of the greatest inertia of the area. In particular, such an adjustment device must be designed exclusively (protecting) from Euler's bending, which allows only very little area inertia and thus much less material is required than necessary for compensating lateral forces. This way the adjustment device can be constructed with little weight and low structural space requirements. Any transmission of the rotation of the shaft of the adjusting unit can occur via a sprocket, for example, which engages the geared rods at the ramp collar and thus changes the position of said ramp collar.

In another advantageous embodiment of the friction clutch an adjustment device according to the above-stated description is inserted in the friction clutch.

An adjustment spindle is particularly immune against a rotation under stress in the axial direction, which is here aligned along the centrifugal force. Additionally, it can be used with a particularly advantageous implementation of the adjustment via a link with a link block. Furthermore, the spindle nut can be supported axially disengaged from the adjustment spindle such that the forces upon the adjustment spindle are reduced to the weight forces and the drive forces. Furthermore, such an arrangement is embodied preferably in a self-locking fashion, so that no additional locking brake needs to be provided, which interrupts any undesired further rotation due to centrifugal forces.

In another advantageous embodiment of the friction clutch the adjustment device is fastened on the rear of the pressure plate.

When using the rear of the pressure plate as the location for fastening the adjustment device it can here be utilized that the pressure plate due to the transmission of the compression forces must already be embodied sufficiently massive in order to securely fixate the adjustment device thereat. Furthermore, particularly via a path control the change of the distance between the pressure plate and the engagement device can be securely realized without here it being necessary to provide an additional component for fixating the adjustment device.

In another advantageous embodiment of the friction clutch the adjusting unit and the ramp collar are embodied in one piece and the pressure plate has a rear sloped in reference to the pressure side.

Advantageously the adjusting unit may be connected fixed to the ramp collar or the pressure plate and/or form a single component therewith. This way the distance between the adjusting unit and the adjustment spindle can be altered. The motion of the adjusting unit in the direction of engagement is here compensated such that the adjustment spindle is inclined in the direction of engagement and thus follows the movement of the adjusting unit. Such an embodiment is very robust and shows little complexity.

In another advantageous embodiment of the friction clutch the driving devices of the adjustment device is arranged at an exterior circumference of the pressure plate.

An arrangement at the exterior circumference here particularly results in that the driving device, seen in the radial direction, is not covered by another component but rather is freely accessible in this direction. By arranging the adjustment device at the exterior circumference of the pressure plate the access to the adjustment device is facilitated. Here, it is particularly advantageous to arrange the rotational driving device of the adjustment device towards the outside such that for example during shop maintenance, e.g., for manual adjustments, here access is possible without any extensive disassembly. In particular, parts of the adjustment device can be accessed via a small opening in the housing of the friction clutch, which is not possible in a lateral arrangement of the adjustment device.

In another advantageous embodiment of the friction clutch the adjustment spindle extends through a recess in the ramp collar, with said recess corresponding to the maximum rotation of the ramp collar.

Here, the ramp collar may be assembled from several ramps, which correspond to a plurality of ramps on the rear of the pressure plate. Here, recesses form between these ramps, which are sufficient to house the here described adjustment spindle in the radial direction so that the adjustment spindle can extend from the exterior circumference of the pressure plate towards the center of rotation of the friction clutch. However, a single pair of ramps is also possible. Furthermore, an additional recess may be provided in the ramp collar, which is equivalent to a maximum angle of rotation of the ramp collar for adjusting the friction clutch. This way, only minor or no constructive changes are necessary at the conventional pressure plates with adjustment rings so that any required retrofitting of the friction clutch with the adjustment device described here is of very minor extent.

According to another aspect of the invention a motor vehicle is suggested, which includes a drive unit with a driven shaft, a drive train, and a friction clutch for a detachable connection of the driven shaft to the drive train, with the drive unit in the motor vehicle being arranged in front of a cab and perpendicular in reference to a longitudinal axis of the motor vehicle.

Most motor vehicles today have a front-wheel drive and thus preferably include a drive unit, for example an internal combustion engine or an electric engine, in front of the cab and perpendicular in reference to the primary driving direction. In such an arrangement the structural space is particularly small and thus it is especially advantageous to use a clutch exhibiting a small structural size.

The situation of the structural space in passenger vehicles of the compact class according to European classification is even more severe. The aggregates used in passenger vehicles of the European compact class are not much smaller compared to those of passenger vehicles of larger vehicle classes. However, the structural space available in compact vehicles is much smaller. The above-described adjustment device and/or friction clutch is particularly advantageous for compact vehicles because the overall structural size is small and additionally an extremely reliable adjustment is achieved. Passenger vehicles are allocated to a vehicle class for example according to size, price, weight, and performance, with this definition constantly being subject to change based on the needs of the market. In the US-market the vehicles of the compact and ultra-compact class according to European classification are allocated to the class of subcompact car and in the British market they are equivalent to the class of super-mini, for example the class of city car. Examples of the subcompact class are the Volkswagen Fox or the Renault Twingo. Examples of the compact class are the Alfa Romeo Mito, the Volkswagen Polo, the Ford Fiesta, or the Renault Clio.

The features listed individually in the claims can be combined arbitrarily in a technologically useful fashion and may be complemented by explanatory facts discernible from the description and details from the figures, with additional variants of the embodiment of the invention being shown here.

BRIEF DESCRIPTION OF THE DRAWINGS

In the following, the invention and the technical environment are explained in greater detail based on the figures. The figures show particularly preferred embodiments, with the invention not being limited thereto, though. In particular, it shall be pointed out that the figures and particularly the scale shown are only schematic. It shows.

DETAILED DESCRIPTION OF THE PREFERRED EMBODIMENTS

Figure 1:
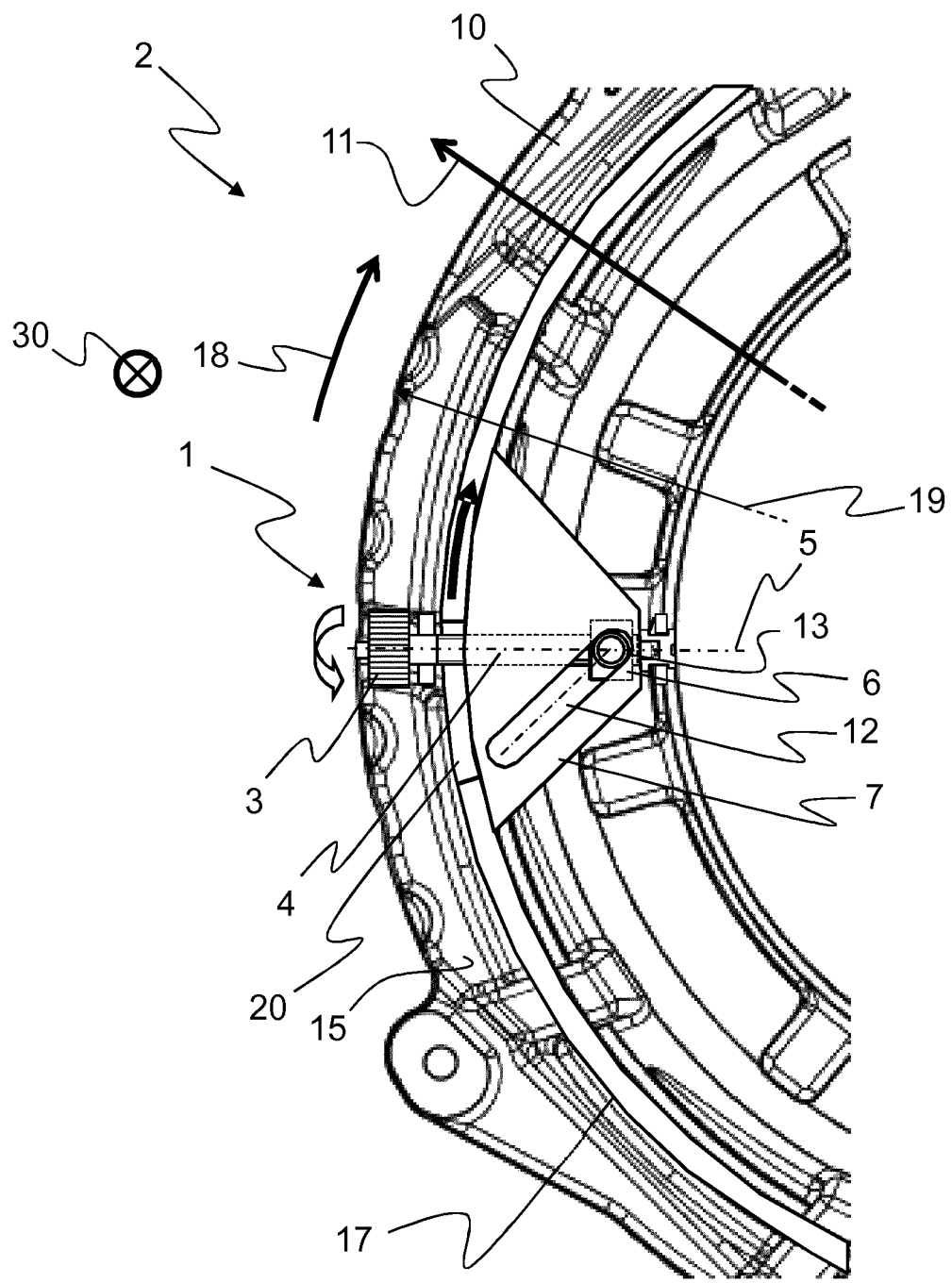
FIG. 1: an adjustment device in a top view of a friction clutch.

FIG. 1 shows an adjustment device 1, with here a detail of the friction clutch 2 being shown, with the adjustment device 1 being arranged on the rear 15 of the pressure plate 10. The axial direction 5 of the adjustment spindle 4 is arranged parallel in reference to a radial direction 11 of the friction clutch 2. The rotational driving device 3 is arranged at the exterior circumference 19 of the pressure plate 10. The adjustment spindle 4 extends through a recess 20 in the ramp collar 17. By rotating the driving device 3 the spindle nut 6 moves outwardly on the adjustment spindle 4 in the axial direction 5 (indicated by an arrow in the left direction of the illustration). This way, the link block 13 moves in the link 12 of the adjusting unit 7 in the axial direction 5 and/or the radial direction 11 of the friction clutch 2. This way the ramp collar 17 is moved in the circumferential direction 18, which is indicated by the arrow on the ramp collar 17. The ramp 16 of the pressure plate 10, hidden in this illustration, in cooperation with the ramp collar 17 causes a motion of the pressure plate 10 in the direction of engagement 30 as shown here into the image plane.

Figure 2:
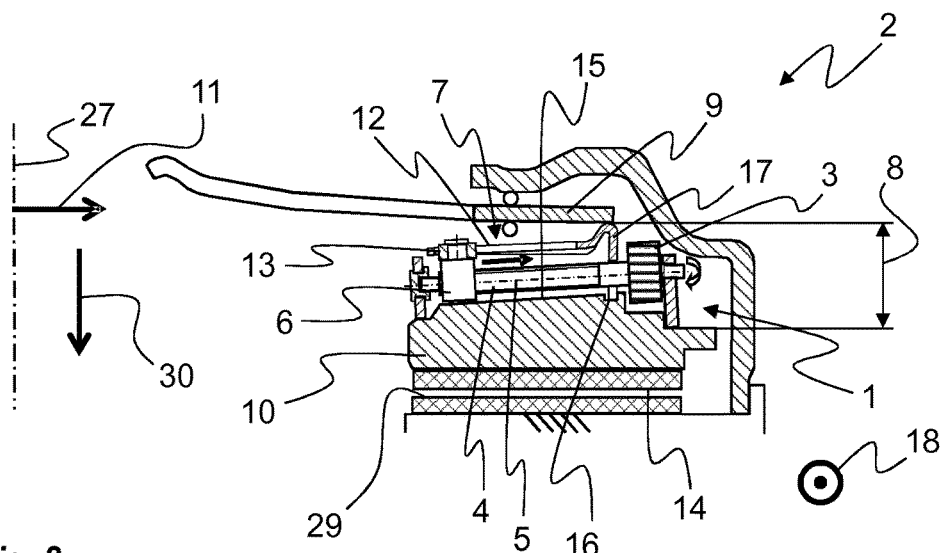
FIG. 2: an adjustment device in a cross-section with an inclined arrangement.
Figure 3:
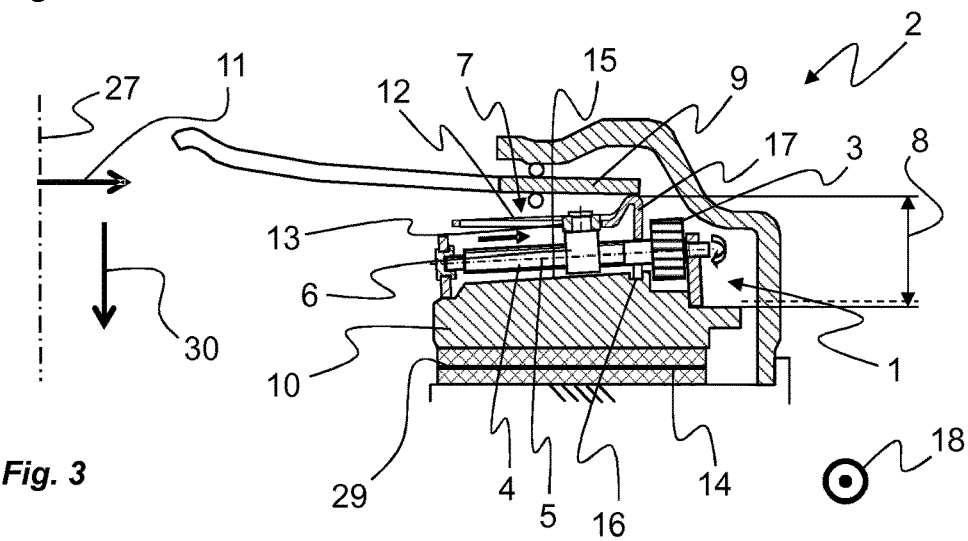
FIG. 3: an adjustment device similar to FIG. 2 with an adjusted link block.

FIG. 2 shows an adjustment device 1 in a cross-section, which is arranged in a friction clutch 2, with a detail thereof being shown here. In this example the adjustment device 1 is arranged with the driving device 3 of the adjustment spindle 4 with the axial direction 5 on an inclined rear 15 of the pressure plate 10. This way, in spite of an increasing distance 8 between the engagement device 9 and the pressure plate 10 of the link block 13, a sufficient height is given by the link 12, as shown in FIG. 3. The pressure side 14 is provided opposite the rear 15 of the pressure plate 10, which pressure side is arranged opposite a corresponding friction area 29. The pressure plate is moved by the engagement device 9 in the direction of engagement 30, which is aligned along the axis of rotation 27 of the friction clutch 2. The spindle nut 6, which is moved by a rotation of the driving device 3 along the axial direction 5 and/or the radial direction 11 of the friction clutch 2, is here moved with the ramp collar 17, embodied in one piece with the adjustment unit 7, in the circumferential direction 18, which here projects out of the image plane. This way the ramp collar 17 moves on at least one ramp 16 of the pressure plate 10 such that the distance between the engagement device 9 and the pressure plate 10 is altered and thus also the distance between the wearing out areas of the pressure plate 14 and the corresponding friction area 29.

FIG. 3 shows a completely adjusted friction clutch 2, with here the change of the distance 8 being indicated by the dot-dash line. It is also discernible in FIG. 3 that the link block 13 remains in the link 12 by the incline of the adjustment spindle 4, although the distance between the rear 15 of the pressure plate 10 and the adjusting unit 7 increases with the growing distance 8 between the pressure plate 10 and the engagement device 9. For the rest, FIG. 3 is equivalent to FIG. 2.

Figure 4:
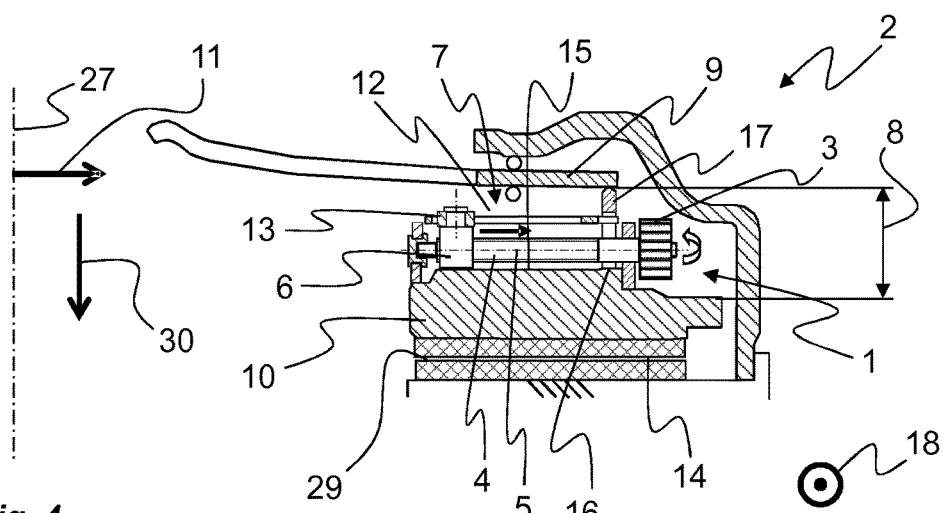
FIG. 4: an adjustment device in a straight arrangement.

FIG. 4 shows a similar arrangement as FIGS. 2 and 3, with here the adjustment spindle 4 in its axial direction 5 being arranged parallel to the illustration of the horizontal pressure side 14. Here, the ramp collar 17 and the adjusting unit 7 represent two separate components. The adjusting unit 7 remains at a constant distance from the adjustment spindle 4 and the ramp collar 17, which moves upwards at least one ramp 16, is entrained for example via the gears at an adjusting unit 7 so that the relative motion is possible in the direction of engagement 30. In this embodiment the link block 13 also remains in the link 12 and thus the engagement process is ensured.

Figure 5:
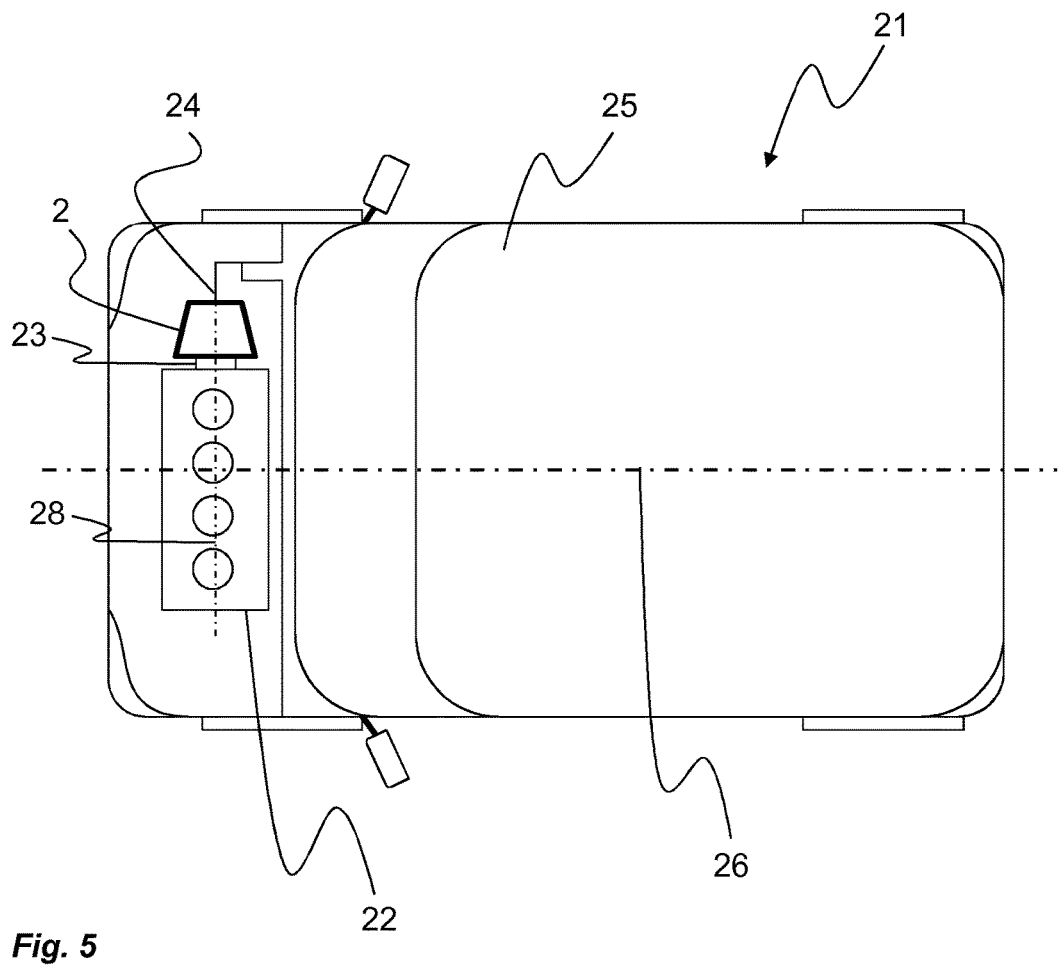
FIG. 5: a motor vehicle with a friction clutch.

FIG. 5 shows a motor vehicle 21 with a drive unit 22, detachably connected with its driven shaft 23 via the friction clutch 2 to a drive train 24, shown purely schematically. The drive unit 22 is arranged with the motor shaft 28 perpendicular in reference to the longitudinal axis 26 of the motor vehicle 21 and in front of the cab 25.

The adjustment device and/or the friction clutch suggested here allow, with fewer production requirements and low weight and/or structural space, the realization of a robust functional unit, which is designed sufficiently strong in reference to centrifugal forces applied, here.

LIST OF REFERENCE CHARACTERS

1 Adjustment device
2 Friction clutch
3 Driving device
4 Adjustment spindle
5 Axial direction
6 Spindle nut
7 Adjusting unit
8 Distance
9 Engagement device
10 Pressure plate
11 Radial direction
12 Link
13 Link block
14 Pressure side
15 Rear
16 Ramp
17 Ramp collar
18 Circumferential direction
19 Exterior circumference
20 Recess
21 Motor vehicle
22 Drive unit
23 Driven shaft
24 Drive train
25 Cab
26 Longitudinal axis
27 Axis of rotation
28 Motor shaft
29 Corresponding friction area
30 Direction of engagement

The invention claimed is:

1. An adjustment device for a friction clutch, comprising:
   a rotational driving device;
   an adjustment spindle with an axial direction, connected to the driving device in a torsionally fixed fashion;
   a spindle nut movable in the axial direction by rotation of the adjustment spindle;
   an adjusting unit that adjusts a distance between an engagement device and a pressure plate, which is adjusted due to a simultaneous axial motion of the spindle nut, and
   the axial direction of the adjustment spindle is on a line which points from a central axis of the friction clutch towards an exterior circumference of the friction clutch.

2. An adjustment device according to claim 1, wherein the adjusting unit comprises a link and the spindle nut comprises a link block corresponding to the link.

3. An adjustment device according to claim 1, wherein the spindle nut is supported axially decoupled from the adjustment spindle.

4. The adjustment device according to claim 2, wherein the link is a channel and the link block moves within the channel via movement of the spindle nut.

5. A friction clutch comprising:
a pressure plate comprising a pressure side and an opposite rear side having at least one ramp;
a ramp collar corresponding to the at least one ramp for changing distances between an engagement device and the pressure plate by rotation of the ramp collar in a circumferential direction, which is in contact with at least one ramp of the pressure plate; and
an adjustment device that adjusts a distance between the engagement device and the pressure plate via non-rotational motion of an adjustment component in an axial direction, and
the axial direction is on a line which points from a central axis of the friction clutch towards an exterior circumference of the friction clutch.

6. A friction clutch according to claim 5, wherein the adjustment device includes:
a rotational driving device;
an adjustment spindle oriented in the axial direction, connected to the driving device in a torsionally fixed fashion;
the adjustment component, which is a spindle nut movable in the axial direction by rotation of the adjustment spindle; and
an adjusting unit that adjusts the distance between the engagement device and the pressure plate by the motion of the spindle nut in the axial direction.

7. A friction clutch according to claim 6, wherein the adjustment device is fastened on a rear of the pressure plate.

8. A friction clutch according to claim 6, wherein the adjusting unit and the ramp collar are formed in one piece and the rear side of the pressure plate is inclined in reference to a pressure side.

9. A friction clutch according to claim 6, wherein the driving device of the adjustment device is arranged at an exterior circumference of the pressure plate.

10. A friction clutch according to claim 6, wherein the adjustment spindle extends through a recess in the ramp collar, with the recess corresponding to a maximum rotation of the ramp collar.

11. A motor vehicle comprising a drive unit with a driven shaft, a drive train, and a friction clutch according to claim 6 for detachable connection of the driven shaft to the drive train, with the drive unit in the motor vehicle being arranged in front of a cab and perpendicular in reference to a longitudinal axis of the motor vehicle.

12. The friction clutch according to claim 5, wherein the adjustment of the distance between the engagement device and the pressure plate is a direct result of the non-rotational motion of the adjustment component in an axial direction.

* * * * *